May 29, 1934.　　　　J. D. WALLACE　　　　1,960,256

METHOD AND APPARATUS FOR MEASUREMENT OF MODULATION

Filed March 12, 1931　　5 Sheets-Sheet 1

INVENTOR.
James D. Wallace,
BY Robert A. Lavender
ATTORNEY.

May 29, 1934.  J. D. WALLACE  1,960,256
METHOD AND APPARATUS FOR MEASUREMENT OF MODULATION
Filed March 12, 1931   5 Sheets-Sheet 2

INVENTOR.
James D. Wallace,
BY Robert A. Lavender
ATTORNEY.

May 29, 1934.    J. D. WALLACE    1,960,256
METHOD AND APPARATUS FOR MEASUREMENT OF MODULATION
Filed March 12, 1931    5 Sheets-Sheet 3

INVENTOR.
James D. Wallace,
BY
Robert A. Lavender
ATTORNEY.

May 29, 1934.  J. D. WALLACE  1,960,256

METHOD AND APPARATUS FOR MEASUREMENT OF MODULATION

Filed March 12, 1931  5 Sheets-Sheet 4

INVENTOR.
James D. Wallace,
BY Robert A. Lavender
ATTORNEY

May 29, 1934.    J. D. WALLACE    1,960,256
METHOD AND APPARATUS FOR MEASUREMENT OF MODULATION
Filed March 12, 1931    5 Sheets-Sheet 5

INVENTOR.
James D. Wallace,
BY
Robert A. Lavender
ATTORNEY.

Patented May 29, 1934

1,960,256

UNITED STATES PATENT OFFICE 1,960,256

METHOD AND APPARATUS FOR MEASUREMENT OF MODULATION

James D. Wallace, Washington, D. C.

Application March 12, 1931, Serial No. 522,077

4 Claims. (Cl. 179—171)

(Granted under the act of March 3, 1883, as amended April 30, 1928; 370 O. G. 757)

My invention relates broadly to measuring apparatus and more particularly to a method and apparatus for measuring the percentage of modulation of a modulated radio frequency wave.

One of the objects of my invention is to provide a method of determining the percentage of modulation of a radio frequency wave for determining the adjustments which are necessary for effecting the more efficient transmission of signaling energy.

Another object of my invention is to provide a circuit arrangement for an apparatus adapted to measure the percentage of modulation of a modulated radio frequency wave whereby a positive determination may be made of the operating characteristics of the signaling apparatus.

A further object of my invention is to provide a circuit arrangement for a measuring apparatus adapted to directly measure the variation of the entire power input to an oscillator system for determining the percentage of modulation of the oscillator and thus testing the operating characteristics of the circuit.

Other and further objects of my invention reside in the arrangement of various types of measuring instruments in circuit with an oscillator and modulator, as will be set forth more fully in the specification hereinafter following by reference to the accompanying drawings, wherein:

Figure 1:
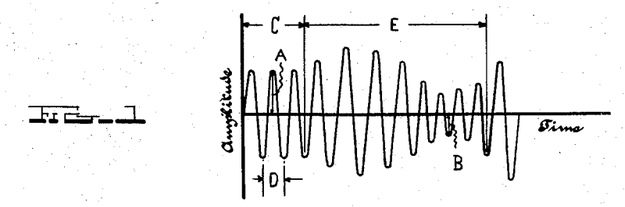
Figure 1 diagrammatically illustrates the characteristic of a modulated radio frequency wave on which the method and apparatus of my invention is effected for measuring the percentage of modulation of the wave.

In the explanation of the apparatus of my invention, it is necessary to analyze a modulated radio frequency wave. For the purpose of explanation it is assumed that the unmodulated radio frequency wave is sine wave in shape. Also, let it be assumed that the modulating disturbance is sine wave in shape. Then a curve showing the instantaneous values of unmodulated radio frequency current at any time is shown by the portion of the curve called "C" in Fig. 1. The instantaneous value of this current is equal to $$A \sin \theta$$

where $\theta$ represents instantaneous angular time values in the carrier frequency cycle. If this wave is modulated, its instantaneous values at any time are shown in Fig. 1 by the portion of the curve to the right of "C". It may be shown that the instantaneous current at any time is equal to $$A \sin \theta \, (1+P \sin \phi),$$

where $$P = \frac{A-B}{A} \times 100. \quad (1)$$

This value of "B" may be found from the curve in Fig. 1. By definition "P" is called the percentage of modulation and may vary from 0 to 100. The value $\phi$ corresponds to a modulating cycle such as "E" in Fig. 1.

It is necessary to know the average radio frequency power at any instant in the modulating cycle. The instantaneous power in the wave of Equation (1) is proportional to the square of the instantaneous current. Therefore, to know the average radio frequency power at any given instant in the modulating cycle, it is necessary to integrate the square of Equation (1) multiplied by an increment of time over an entire radio frequency cycle, and divide this result by the length of time of the radio frequency cycle. This expression integrated is equal to $$\frac{A^2 K}{2}(1+P \sin \phi)^2 \quad (2)$$

where K is a constant.

The above equation has three variables: average radio frequency power, percentage of modulation, and angular position in the modulating cycle. Consequently, the relationships shown in Equation (2) cannot be expressed by one curve, but must be shown by a family of curves. By means of the curves shown in Fig. 2 the average radio frequency power at any instant in the modulating cycle may be determined for five different percentages of modulation.

Figure 2:
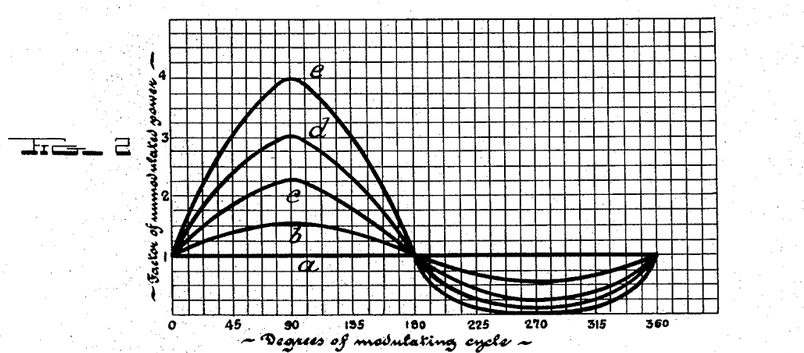
Fig. 2 illustrates a multiplicity of curves which I have drawn illustrating the instantaneous values of the average radio frequency power at any part of the modulated cycle, each curve representing different percentages of modulation.

In the curves illustrated in Fig. 2, the instantaneous value of average radio frequency power has been illustrated by plotting as ordinates, the factor of unmodulated power, and as abscissas, degrees of modulated cycle, the different curves representing different values of percentage of modulation. Curve $a$ assumes a zero percentage of modulation; curve $b$ assumes a percentage of modulation equal to 25; curve $c$ assumes a percentage of modulation equal to 50; curve $d$ assumes a percentage of modulation of 75; and curve $e$ assumes a percentage of modulation of 100.

It is also necessary to know the average radio frequency power in a modulated wave form during an entire modulating cycle for any percentage of modulation. This may be obtained by integrating Equation (2) multiplied by an increment of time over a modulating cycle, and dividing this result by the length of time of the modulating cycle. By this means it is found that the average radio frequency power is equal to $$\frac{KA^2}{4}(P^2+2) \quad (3)$$

Figure 3:
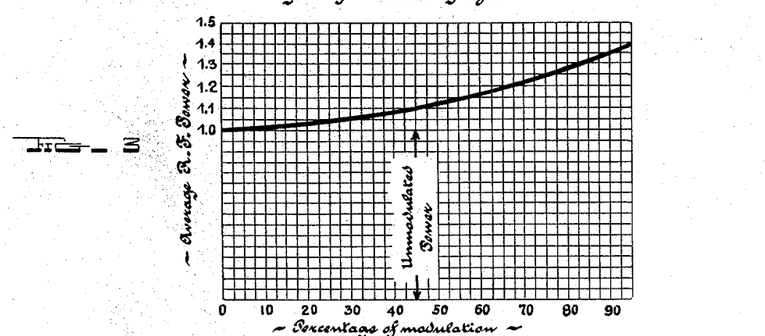
Fig. 3 shows a curve illustrating the average radio frequency power existent in an entire modulated cycle at various percentages of modulation.

This expression has only two variables and can therefore be expressed by one curve. This is shown in Fig. 3 wherein a curve is shown plotted with average radio frequency power as ordinates, and the percentage of modulation as abscissa, thereby representing the average radio frequency power at various percentages of modulation. It will later be shown why a knowledge of the information given above is necessary to explain the various circuits of my invention which may be used to measure percentage of modulation.

The circuits of my invention for measuring percentage of modulation will first be explained in connection with the "constant current" system of modulation. Let it be assumed that the d. c. voltage applied to the oscillator tube is "E". Also let it be assumed that the oscillator and modulator, when no modulating voltage is applied to the modulator grid circuit, each draw equal currents, and the value of the current drawn by each tube is called "I". Also, it is assumed that the modulating choke has a very high impedance compared with the plate impedance of either oscillator or modulator at the modulating frequency. Consequently, when modulating a radio frequency wave, the sum of the instantaneous values of current drawn by the oscillator and modulator are the same as the total current drawn by the tubes unmodulated. Then let it be assumed that a modulating disturbance sine wave in form is impressed between the grid and filament of the modulator, which has sufficient amplitude to cause an alternating current component in modulator plate circuit which has a peak value equal to "Q1", (obviously Q cannot be greater than unity) whereby an alternating voltage component of an amplitude "QE" is caused to be superposed upon the modulator plate. The alternating component of modulator plate voltage and modulator plate current are 180° out of phase. The impressing of the modulating frequency on the grid of the modulator will also cause alternating components in plate voltage and current in the oscillator input. Also, it should be observed that alternating voltage and current components in the oscillator plate supply are in phase. From the above data, it is possible to calculate the average radio frequency power in any part of the modulating cycle.

If conditions are as were assumed in regard to the amplitude of the modulating disturbance, the wave form of the instantaneous plate voltage applied to the oscillator is $$E + QE \sin \phi$$

and that of the instantaneous plate current is $$I + QI \sin \phi.$$

The average radio frequency power at any point in the modulating cycle may be determined by multiplying the instantaneous plate current by the instantaneous plate voltage at this particular part of the modulating cycle (assuming that the efficiency of the oscillator as radio frequency generator is constant with varying plate voltage). Also, an equation may be developed to determine the average radio frequency power at any part of the modulating cycle by multiplying the equation for instantaneous current by that for instantaneous voltage applied to the oscillator. This equation may be shown to be $$EI(1+Q \sin \phi)^2 \quad (4)$$

A comparison of Equation (2) with the above equation shows that the equations are dimensionally equivalent. As a consequence it may be shown that the same relationship holds for Equation (4) as was shown to hold for Equation (2). The instantaneous value of the plate input power at any part of the modulating cycle for any percentage of modulation may be shown by a family of curves identical to those shown in Fig. 2.

Figure 4:
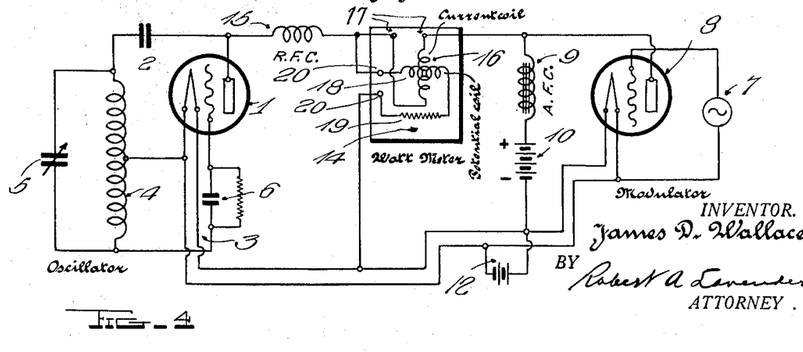
Fig. 4 shows one form of apparatus arranged according to my invention for the measurement of the percentage of modulation of a modulated radio frequency wave.

Since it has been shown in the constant current system of modulation, that the average power input increases as the percentage of modulation increases, therefore, the percentage of modulation of a wave may be determined by measuring the input power unmodulated, then measuring the input power modulated and then examining the curve in Fig. 3; also a wattmeter may be placed permanently in the circuit and calibrated in percentage of modulation in this manner. When the wave is not being modulated, observe the reading of the wattmeter, and call that point zero percentage of modulation. Next, modulate the wave and determine the increase in power. A study of the curve in Fig. 3 will enable one to determine its percentage of modulation, by the relative power used when unmodulated and modulated. By taking various readings, it would be possible to calibrate this wattmeter in percentage of modulation. The circuit in Fig. 4 shows the electrical connections necessary for using a wattmeter in this manner. A self oscillating tube is indicated by reference character 1. The oscillating tube 1 has its output circuit 2 and its input circuit 3 connected through an inductance 4 shunted by variable condenser 5 for establishing oscillations. The input circuit of the oscillator includes a grid leak and grid condenser 6 connected as shown. The modulated energy is supplied from the source 7 to the input circuit of the modulator 8, the output circuit of modulator 8 including the audio frequency choke coil 9 and high potential source 10. The cathodes of the oscillator tube 1 and modulator tube 8 are both heated from battery 12. A wattmeter 14 is connected between the circuits of of the modulator 8 and the circuits of the oscillator 1 as shown to the radio frequency potential coil 15 in such a manner that the total oscillator input power determines the deflection of this instrument. The current coil of wattmeter 14 is indicated at 16, and is connected in series between the output circuit of modulator 8 and the circuit of the oscillator 1 through binding posts 17. The potential coil 18 of the wattmeter is connected in series through resistance 19 to binding posts 20 which connect across the circuit of the oscillator 1 as shown.

It is not necessary to use a wattmeter which measures both alternating and direct components of power in measuring the percentage of modulation, but an instrument which measures only the alternating component may be used for the purpose. Referring to Equations 2 and 4, it is seen that they are dimensionally the same, and also that $P$ in Equation 2 is equal to $Q$ in Equation 4. Now if Equation 4 is taken and $P$ is substituted for its equal $Q$, and the continuous component of power is eliminated, the result gives the alternating component of power at any given instant provided the percentage of modulation is known. This equation expresses the alternating component of power at any time, which also is shown to depend on the percentage of modulation. It may be written thus:

$$EI(P \sin \phi)^2$$

The continuous component of power is equal to $EI$.

The ratio of the instantaneous value of the alternating component of power at any particular percentage of modulation to the continuous component is expressed by this equation:

$$\frac{EI(P \sin \phi)^2}{EI}$$

This ratio is thereby equal to:

$$(P \sin \phi)^2 \qquad (5)$$

Figures 5, 6:
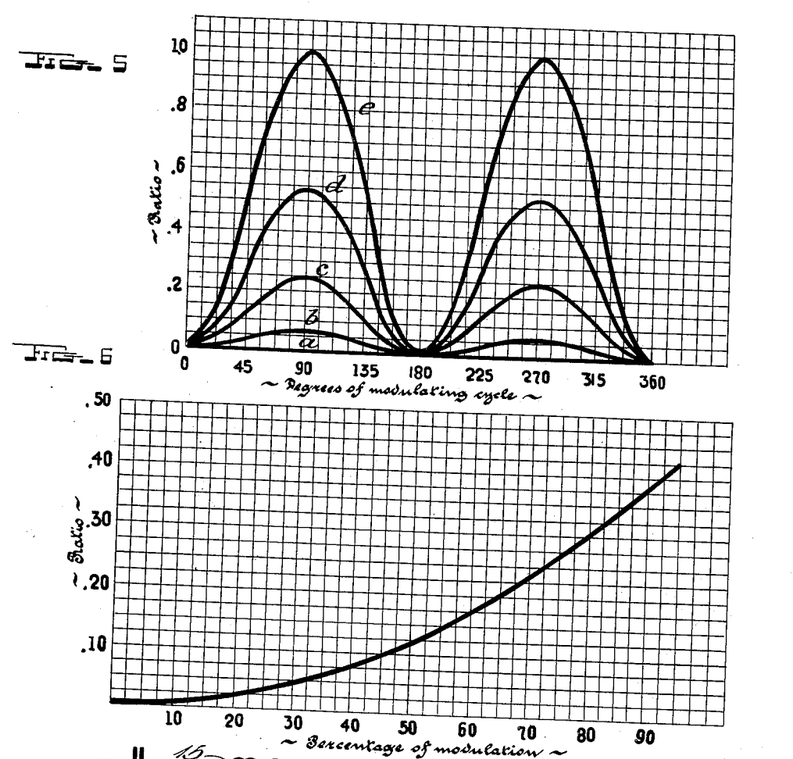
Fig. 5 is a chart illustrating the instantaneous ratio of alternating and direct current components of the oscillator input power of the apparatus illustrated in Fig. 4 for different percentages of modulation.
Fig. 6 is a curve showing the ratio of the average value of the alternating current component and direct current component of power input of a generator of modulated radio frequency power, over an entire modulated cycle at various percentages of modulation as determined by the circuits of my invention.

To show the instantaneous value of this ratio, it will be necessary to plot a family of curves such as shown in Fig. 5. The curves of Fig. 5 are drawn with ratio as ordinates, and degrees of modulating cycle as abscissa, to show the instantaneous ratio of alternating and direct current components of the oscillator input power at any part of the modulating cycle. The series of curves have been drawn assuming curve $a$ to have a percentage of modulation equal to zero; curve $b$ to have a percentage of modulation equal to 25; curve $c$ to have a percentage of modulation equal to 50; curve $d$ to have a percentage of modulation equal to 75; and curve $e$ to have a percentage of modulation equal to 100, as was the condition illustrated in Fig. 2.

Equation 5 may be multiplied by an increment of time, integrated over an entire modulating cycle and divided by the time of a modulating cycle, thereby obtaining an equation which expresses at any percentage of modulation the ratio of the average alternating component of power to the continuous component of power fed into a modulated oscillator such as shown in Fig. 4. The solution of this expression shows this to be the ratio:

$$\frac{P^2}{2} \qquad (6)$$

The relationship expressed by equation 6 may be expressed by one curve and this is shown in Fig. 6 wherein the ordinates represent the ratio of the average value of the alternating component to the direct component of power, whereas the abscissa represents the percentage of modulation. When the curve in Fig. 6 is compared with the curve in Fig. 3, a similarity is observed. Therefore, the increase in power input to an oscillator when modulated is due entirely to the alternating component of power. It therefore appears that a measurement of the amplitude of the alternating component of voltage current or power may be utilized for measuring the percentage of modulation.

Figure 7:
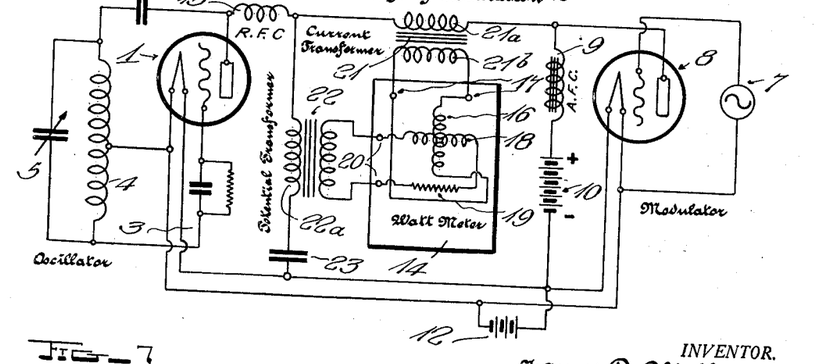
Fig. 7 is a circuit arrangement of a modified form of measuring apparatus embodying my invention by which the percentage of modulation in a constant current system of modulation may be measured.

A method of measuring the percentage of modulation by measuring the amplitude of the alternating component of power in the oscillator will first be considered by reference to Fig. 7. The constant current system of modulation is shown utilizing a general circuit arrangement similar to Fig. 4. A current transformer 21 is placed in a position that the alternating component of oscillator plate current must pass through the primary winding 21$a$. The secondary winding 21$b$ of the current transformer 21 connects to the current coil terminals 17 of the wattmeter. A potential transformer 22 is placed in a position that the alternating component of oscillator plate voltage will be impressed across its primary 22$a$. A condenser 23 having a small impedance for modulating frequencies must be inserted in the primary circuit of the potential transformer to prevent a direct component of power from the plate supply 10 from flowing through the primary winding 22$a$. Let it be assumed, for the purpose of explanation only, that each transformer 21 and 22 has an identical primary and secondary winding. Next, place the oscillator 1 in operation and by any other means measure the quantity of power the oscillator requires unmodulated. Next, modulate the wave by applying source 7 and read the value of the alternating component of power. Next, divide the alternating component by the direct component and from the value of this ratio and from a study of the curve in Fig. 6, the percentage of modulation may be obtained. By this means a wattmeter connected as in Fig. 7 may be permanently left in a particular circuit, and once calibrated, it may be relied upon to determine the percentage of modulation of the radio frequency wave. From a study of the relationships in the circuit in Fig. 7, it is obvious that the percentage of modulation will be proportional to the square root of the deflection of the wattmeter.

It has been previously shown that the wave form of the voltage across a modulated oscillator 1 in the constant current system of modulation is given by this equation:

$$E + PE \sin \phi$$

The alternating component of voltage is equal to $$PE \sin \phi$$

and its ratio to the direct component is $$P \sin \phi \qquad (7)$$

It is obvious that ratio of the instantaneous values of the alternating component of voltage to the direct component is expressed by a family of curves all sine wave in form whose peak value depends upon the magnitude of "P". As it is desirable to read this voltage by means of a root mean square instrument, the effective value of this wave form must be determined. It may be shown to be $$\frac{\sqrt{2}}{2} P \text{ or } .707 P \qquad (8)$$

Equation 8 has for its curve a straight line. Therefore, it is shown that the effective value of the alternating component of plate voltage is proportional to the percentage of modulation. The alternating component may be removed from the direct component by using a potential transformer 24 and by-pass condenser 25 as shown in connection with the modulation circuit in Fig. 8. The primary winding 24a and condenser 25 are connected in series across the output of the modulator circuit and across the oscillator circuit as shown. The secondary 24b may be connected to a voltmeter 26 as shown, and when the voltmeter has been properly calibrated it will serve as a device for measuring percentage of modulation. Considering that the voltmeter used must be an alternating current type, and that it has a squared scale, it will be understood that the deflection of the voltmeter used in this manner will be proportional to the square of the percentage of modulation. The moving coil system of the voltmeter has been indicated at 27 connected to terminals 28 which connect to the secondary winding 24b.

Figure 9:
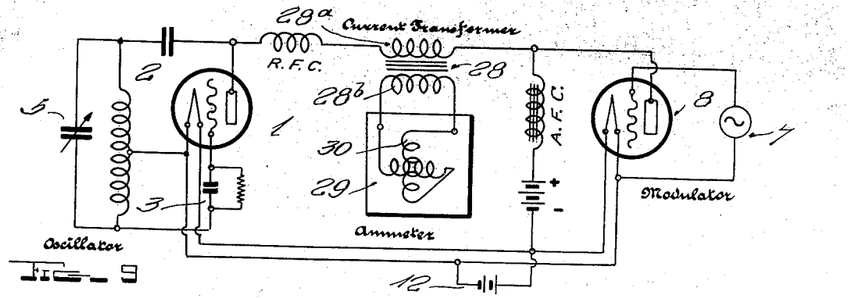
Fig. 9 shows a further modified form of apparatus for measuring percentage of modulation on which the alternating current component of the plate circuit is employed.

The alternating component of the oscillator plate current has the same wave form as that of the plate voltage. Consequently a measurement of the percentage of modulation of the oscillator may be taken using the alternating plate current instead of the alternating plate voltage. Fig. 9 shows a circuit, the measuring instrument of which is operated by the flow of the alternating component of plate current. A current transformer 28 must be used to remove the alternating component of plate current, and an alternating current ammeter 29 must be used as the measuring instrument. The ammeter 29 may be calibrated in percentage of modulation. The deflection of the instrument will be proportional to the square of the percentage of modulation. The moving coil element of the ammeter is shown at 30 connected to the secondary winding 28b of the transformer 28 where the primary winding 28a is in series between the output of modulator tube 8 and the oscillator 1.

It has been shown that the wave form of the voltage impressed on the oscillator is expressed by this equation:

$$E + PE \sin \phi$$

The effective value of the voltage of this wave form may be calculated and is shown to be $$E\sqrt{1 + \frac{P^2}{2}}.$$

The above value of voltage would be read by a root mean square voltmeter, but a continuous current voltmeter would read at the same time E. Now the ratio of the reading of a root mean square voltmeter to that of a continuous current voltmeter may be shown to be equal to $$\sqrt{1 + \frac{P^2}{2}}. \qquad (9)$$

Figure 10:
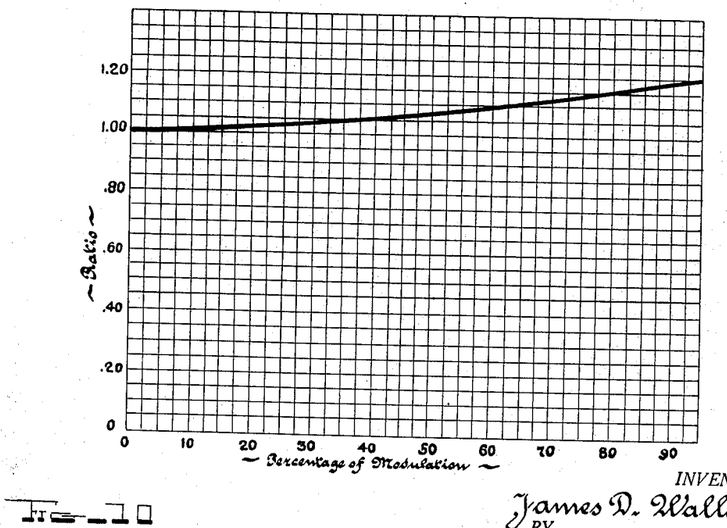
Fig. 10 is a curve illustrating the ratio of the root mean square voltage to the direct current voltage impressed across the plate circuit of the modulated oscillator throughout a modulated cycle, in the apparatus of my invention.
Figure 11:
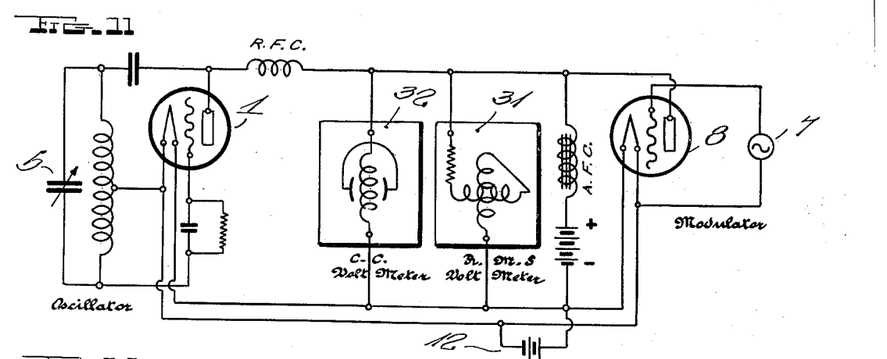
Fig. 11 illustrates a circuit arrangement for a root mean square voltmeter and a continuous current voltmeter connected in circuit for determining the percentage of modulation of the oscillator.

The curve in Fig. 10 shows the relationship between the ratio and percentage of modulation, that is, the ratio of root means square voltage to d. c. voltage impressed across the plate circuit of the modulated oscillator. In a circuit as shown in Fig. 11 using a root mean square voltmeter 31 and continuous current voltmeter 32, the percentage of modulation of the oscillator may be determined by reading the two voltmeters, calculating the ratio of the reading of the root mean square voltmeter to the continuous current voltmeter, and upon finding this ratio determine the percentage of modulation from the curve in Fig. 10.

It was shown that as the percentage of modulation is increased, that the root mean square value of the oscillator plate voltage also increases. By calibrating any root mean square voltmeter in terms of percentage of modulation, it would serve as a determining means. The electrical connections for using this device are shown in Fig. 11, but with this exception, the continuous current voltmeter 32 is eliminated.

Figure 12:
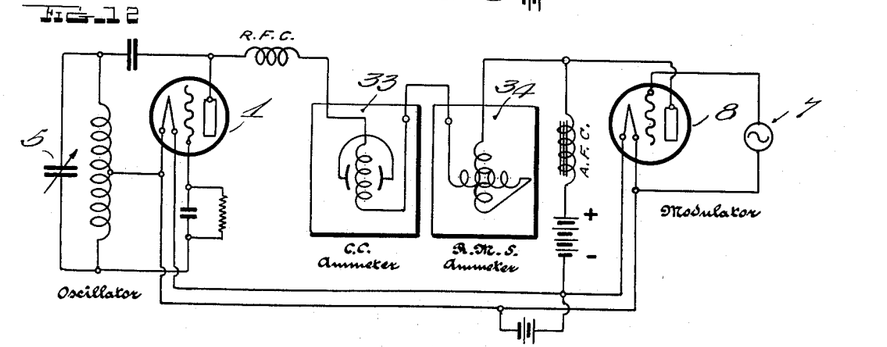
Fig. 12 shows a further modified form of measuring apparatus employing a continuous current ammeter and a root mean square ammeter for measuring the oscillator plate current, and by obtaining a ratio of the meter readings, the percntage of modulation may be determined by reference to the curve illustrated in Fig. 10.

The oscillator plate current wave form is similar to the oscillator plate voltage wave form. Consequently, two ammeters, a continuous current type, and root mean square type, may be used to measure the oscillator plate current, and by obtaining a ratio of their readings, the percentage of modulation may be determined from the curve in Fig. 10. The electrical connections for the two ammeters are shown in Fig. 12 where the ammeters are designated at 33 and 34 constituting the continuous current ammeter and the root mean square ammeter, respectively. I have found that one root mean square ammeter in the oscillator plate circuit may be used to determine the percentage of modulation. The principle of operation of this last named method is similar to that of the one root mean square voltmeter method, which was discussed heretofore in this application. The electrical connections are the same as in Fig. 12 with this exception—the continuous current ammeter 33 is omitted.

The various methods of measuring percentage of modulation hereinbefore described were based on the variation of oscillator plate voltage, or current, or input power. I will proceed to explain some methods which function by variation in modulator plate voltage, or current, or input power. However, it is first necessary to make an analysis of the plate voltage, plate current, and the plate power relationships of a modulator tube as was done for the oscillator tube hereinbefore. In the analysis of the modulator, let it be assumed that conditions are identical to those explained heretofore. The same symbols used in the preceding equations may be also used in the derivation of further equations. The voltage applied to the modulator tube 8 when being modulated is the same as the oscillator plate voltage, since the plate circuits are in parallel and this has been shown to be $$E+QE \sin \phi$$

The wave form of the modulator plate current is the same as the oscillator plate current, but there is a phase difference of 180°. The equation for this wave form is therefore $$I+QI \sin (180°+\phi)$$

Since the above are voltage and current equations respectively, the equation for determining the instantaneous power in the modulator at any part of the modulating cycle may be obtained by their multiplication. This may be shown to be $$EI(1-Q^2 \sin^2 \phi) \qquad (10)$$

Figure 13:
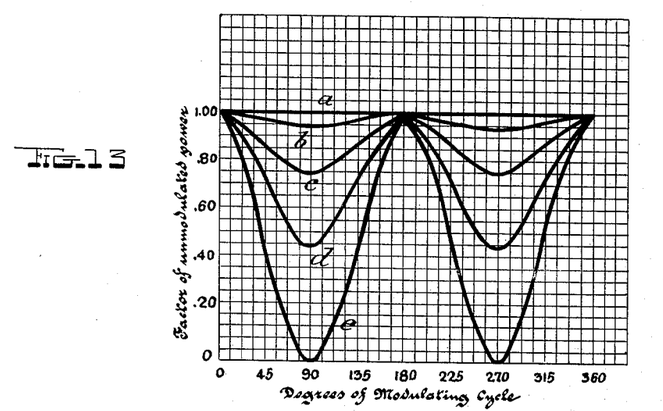
Fig. 13 illustrates a set of curves showing the instantaneous modulator input power throughout a modulated cycle, for different percentages of modulation.

It has been also previously shown that Q is equal to the percentage of modulation. Now since Equation (10) has three variables, it is necessary, when plotting it, to use an entire family of curves to express these relationships. These curves are shown in Fig. 13 wherein the ordinates represent the factor of unmodulated power and the abscissa designate the degrees of the modulating cycle. Curves have been plotted for the percentages of modulation $a$, $b$, $c$, $d$ and $e$ heretofore assumed and show the instantaneous modulator input power.

Since it is proposed to use ordinary measuring instruments for measuring percentage of modulation, they will not respond to the instantaneous changes in modulator power, but will read the average power. To find the average power input to a modulator tube, Equation 10 must be multiplied by an increment of time, integrated over a modulating cycle, and divided by the length of a modulating cycle. By this means the average power is shown to be $$\frac{EI(2-Q^2)}{2} \qquad (11)$$

As this term has only two variables the relationships may be expressed by one curve. The relationships are shown in Fig. 14.

Figure 14:
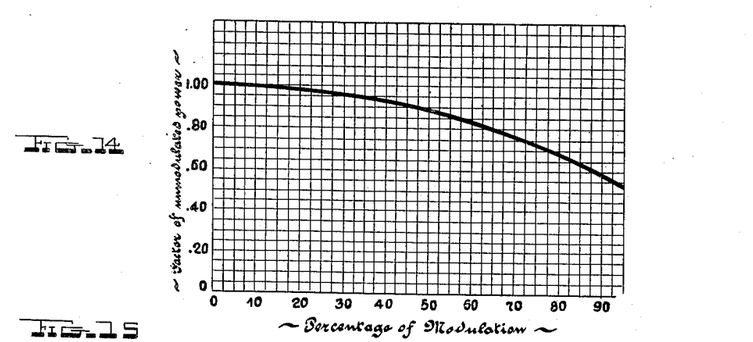
Fig. 14 is a curve showing the average modulator input power at various percentages of modulation.
Figure 15:
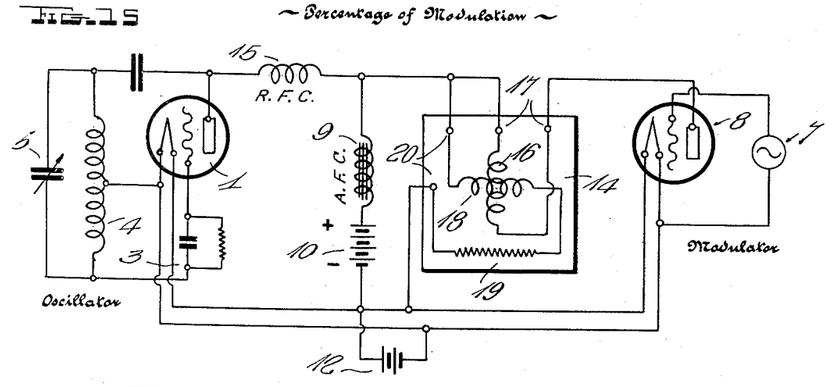
Fig. 15 shows a circuit arrangement for determining the magnitude of the unmodulated input to the modulator tube, and then determining the decrease in power input during modulation, thereby computing from the ratio of the decrease in power during modulation to unmodulated input power, the percentage of modulation of the modulated radio frequency wave.

The curve in Fig. 14 shows that as the percentage of modulation of the radio frequency wave is increased that the modulator input power decreases. Then if a wattmeter be connected permanently in the circuit in such a manner as to read the modulator input power, its reading will depend on the percentage of modulation of the radio frequency wave. A reading of the wattmeter should be taken unmodulated, a reading modulated, and then by finding the ratio of the power unmodulated to that modulated, reference can be made to the curve in Fig. 14, and the percentage of modulation of the oscillator may be determined. If desired, the wattmeter may be calibrated directly in percentage of modulation. This method is similar to one heretofore described in Fig. 4 with this exception—the wattmeter in Fig. 4 measures the oscillator input power, whereas in the last mentioned method the wattmeter measures the modulator input power. It will be observed, however, that the deflection of the wattmeter as described in Fig. 4 increased with percentage of modulation, but a decrease is noted when the wattmeter is used as last described. The circuit in Fig. 15 shows a wattmeter 14 permanently connected in the circuit of the modulator 8 in such a manner that the percentage of modulation of the generated radio frequency wave may be determined as described heretofore in this paragraph. The plate supply to the modulator tube 8 is broken and connected to the current terminals 17 of the wattmeter 14. The current coil 16 of the wattmeter connects to the terminals 17 thereby causing all modulator plate current to pass through coil 16. The potential impressed from plate to filament of the modulator 8 is connected to the potential terminals 20 of the wattmeter. The potential coil 18 and the resistance 19 are connected in series between the terminals 20, thereby causing the modulator plate to filament potential to be impressed on the potential circuit of the wattmeter.

The method of measurement last described utilizes both alternating and direct components of power. However, it is not necessary to use both, for a method is proposed which uses only the alternating component of power. To explain the method will require an analysis of the wave form of the components of modulator power input. It has been previously shown that the alternating component of oscillator plate voltage is equal to $$EP \sin \phi.$$

Now since the modulator is in parallel with the oscillator, this same voltage is impressed on the modulator plate. The alternating component of oscillator plate current has been shown to be equal to $$IP \sin \phi.$$

Also, the alternating component of oscillator plate voltage and current are in phase. But in the constant current system the sum of the oscillator and modulator currents are equal at any instant. Consequently the wave form of the alternating component of modulator plate current is also expressed by this equation $$IP \sin \phi$$

However, the alternating components of oscillator and modulator plate current are 180° out of phase. Therefore, the alternating components of modulator plate voltage and plate current are 180° out of phase. The equation for the alternating component of modulator input power may be found by multiplying the equations for the alternating components of the current and the voltage, and then multiplying the product by the cosine of the phase angle. This is shown to be $$-EI(P \sin \phi)^2$$

The negative sign is used because the power factor is —1. The negative sign before the equation for alternating power only shows that it must be subtracted from the continuous component of power to obtain the total power input. The continuous component of modulator input power is equal to EI, which is a constant. Therefore, it may be said that the instantaneous value of the alternating component of modulator input power is proportional to $$-(P \sin \phi)^2 \qquad (12)$$

Equation 12 is the same as 5 except for a sign. Consequently a family of curves plotted for Equation 12 will be the same as Equation 5 with one exception. The curves drawn for Equation 5 indicate an increase in power but the curves for Equation 12 indicate a decrease in power. By means of an integration the average modulator input power may be obtained for any particular percentage of modulation. This may be shown to equal $$-\frac{P^2}{2} \qquad (13)$$

Equation 13 is equivalent to Equation 6 with the exception of the difference in signs. Consequently the curve which was drawn for Equation 6 will also serve for Equation 13, but it must be remembered that this curve when used in connection with Equation 6 indicates an increase in power, but when used with Equation 12 indicates a decrease in power.

Figure 16:
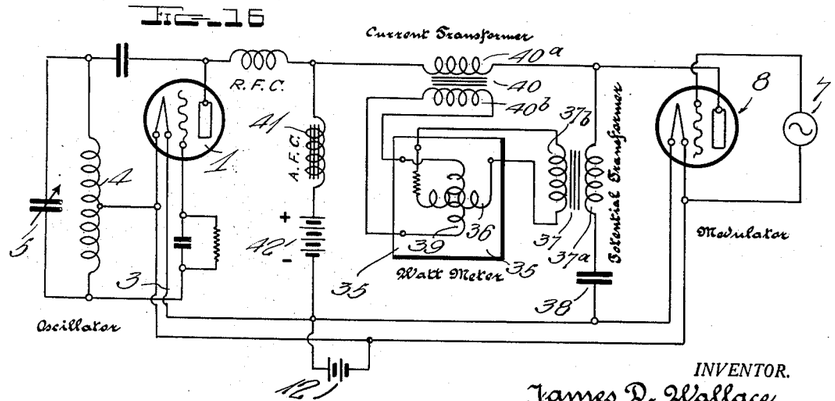
Fig. 16 shows a form of apparatus arranged according to my invention for the measurement of percentage of modulation by determining the magnitude of the alternating component of input power to the modulator tube.

Since it has now been shown that the average alternating component of power is proportional to the square of the percentage of modulation, it is possible to measure the percentage of modulation by measuring the average alternating component of power input. Although the equation has a negative sign in front of it, this makes no difference since a measuring instrument may have one pair of its input terminals reversed and thereby make it deflect in the proper direction. To measure this alternating component of power, a wattmeter must be used in connection with potential and current transformers for removing the alternating component power. By determining the magnitude of the continuous component of power and then determining the alternating component, and next finding the ratio of the alternating to the continuous component, the percentage of modulation may be determined. The electrical connections for such a device is shown in Fig. 16. From a study of the conditions this fact may be stated: The percentage of modulation will be proportional to the square root of the deflection of the instrument. The circuit includes the wattmeter 35 having potential coil 36 connected to the secondary winding 37b of the potential transformer 37 whose primary winding 37a is connected in series with condenser 38 and across the output circuit of modulator tube 8. The current coil 39 of the wattmeter is connected to the secondary winding 40b of the current transformer 30 whose primary winding 40a is disposed in series with the output circuit of the modulator tube 8 and the circuit of the oscillator tube 1. The audio frequency choke 41 is disposed in series with the high potential battery 42 connected in the position shown for supplying the plate circuits of both the modulator tube 8 and the oscillator tube 1.

It has been shown that the alternating component of modulator plate current has the same wave form as that of the oscillator. Consequently, the circuits shown in Figs. 9 and 12 may also be used for the measurement of percentage of modulation if the electrical connections are changed in such a manner as to put them in the modulator plate circuit, instead of in the oscillator plate circuit.

There is a system of producing modulated waves similar to the constant current system, but in this system the oscillator and modulator tubes are operated in series and no audio frequency choke is used. In other words, the constant current system uses parallel plate feed, but the other system sometimes called the constant potential system, makes use of series feed. Wave forms of the input voltage, current and power of the modulator or oscillator tube will be identical to those which have been explained in connection with the constant current system.

From the above discussion it will be understood that the methods shown in Figs. 9 and 12 will function in the same manner if used with the constant potential system of modulation. The plate circuit may be broken at any place and the instruments inserted.

Figure 8:
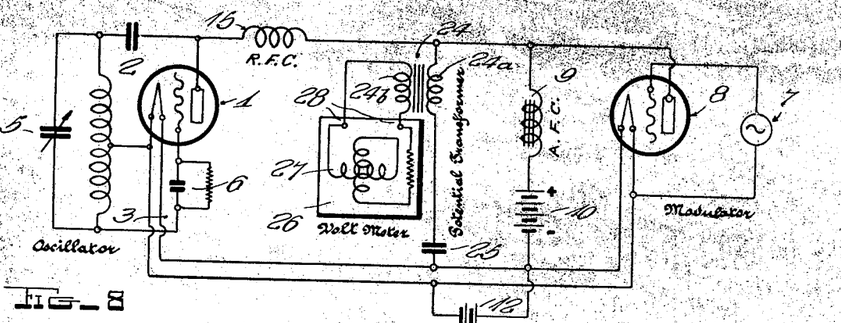
Fig. 8 shows a further modified form of circuit arrangement which may be employed in determining the percentage of modulation using the alternating current component of voltage in the plate circuit instead of the alternating component of plate power utilized in the arrangement of Fig. 7.

The circuits shown in Figs. 8 and 11 will also function in the same manner if used in connection with the constant potential system of modulation. It is necessary to connect these devices from the plate to filament of either the oscillator or modulator.

The methods shown in Figs. 4 and 7 and described with reference to the curve in Figs. 3 and 6 may be used in connection with the oscillator in the constant potential scheme of modulation. Also the methods shown in Figs. 15 and 16 and described with reference to the curve of Figs. 14 and 6 may be used with the modulator in the constant potential scheme of modulation.

While I have described my invention in certain preferred embodiments, I desire that it be understood that modifications may be made and that no limitations upon my invention are intended other than are imposed by the scope of the appended claims.

The invention herein described may be manufactured and used by and for the Government of the United States of America for governmental purposes without the payment of any royalties thereon.

What I claim as new and desire to secure by Letters Patent of the United States is as follows:

1. In a system for measuring the percentage of modulation, an oscillator circuit, a modulator circuit, and a measuring instrument calibrated to directly read percentage of modulation coupling said modulator circuit to said oscillator circuit said measuring instrument comprising a pair of inductively related coils angularly movable by magnetic coaction with respect to each other for indicating the effect of said modulator circuit upon said oscillator circuit.

2. In a system for measuring the percentage of modulation of a modulated radio frequency wave, the combination with a source of modulated radio frequency energy, an oscillator circuit, and means coupling said source of modulated radio frequency energy with said oscillator circuit comprising a wattmeter having a current coil and a potential coil said wattmeter calibrated to directly read percentage of modulation for indicating the variation of the entire power input from the source of modulated energy to said oscillator circuit.

3. In a system for measuring the percentage of modulation of a modulated radio frequency wave, the combination of an oscillator circuit, a modulator circuit, means coupling the output of said modulator circuit with said oscillator circuit including a current coil and a potential coil inductively related and relatively movable an indicator actuated thereby and a calibrated scale with respect to which said indicator operates, said scale being calibrated to directly read percentage of modulation for determining the total power input to the modulator circuit.

4. In a system for measuring the percentage of modulation of a modulated radio frequency wave, an oscillator circuit, a modulator circuit, a measuring instrument including a pair of movable coil elements, one of said coil elements being connected in series between said oscillator circuit and the output of said modulator circuit, and the other of said coil elements being connected in shunt with said oscillator circuit, said coil elements being reactive one with respect to another and a calibrated scale adjacent said coil elements and calibrated to directly read percentage of modulation for indicating the total power delivered by said modulator circuit to said oscillator circuit.

JAMES D. WALLACE.